United States Patent
Yan et al.

(10) Patent No.: US 11,415,079 B2
(45) Date of Patent: Aug. 16, 2022

(54) TURBO-SHAFT EJECTOR WITH FLOW GUIDE RING

(71) Applicant: PRATT & WHITNEY CANADA CORP., Longueuil (CA)

(72) Inventors: Guorong Yan, Montreal (CA); Mark Cunningham, Montreal (CA); Franco Di Paola, Montreal Nord (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 211 days.

(21) Appl. No.: 16/226,717

(22) Filed: Dec. 20, 2018

(65) Prior Publication Data
US 2020/0025132 A1    Jan. 23, 2020

Related U.S. Application Data

(60) Division of application No. 14/514,770, filed on Oct. 15, 2014, now Pat. No. 10,197,009, which is a
(Continued)

(51) Int. Cl.
*F02K 1/38*     (2006.01)
*F02K 1/34*     (2006.01)
(Continued)

(52) U.S. Cl.
CPC .............. *F02K 1/386* (2013.01); *F02C 3/10* (2013.01); *F02K 1/34* (2013.01); *F02K 1/48* (2013.01);
(Continued)

(58) Field of Classification Search
CPC ... F02K 1/04; F02K 1/36; F02K 1/386; F02K 1/46; F02K 1/48; F02K 1/50; F02K 1/52;
(Continued)

(56) References Cited

U.S. PATENT DOCUMENTS 3,092,205 A  *  6/1963  Bertram .................... F02K 1/48
                                                                      181/213
3,647,021 A      3/1972  Millman et al.
(Continued)

FOREIGN PATENT DOCUMENTS

JP    2003065156    3/2003

OTHER PUBLICATIONS

Office ACtion issued in EP application No. 15179131.6.
Extended EP Search Report related to EP application No. 15179131.6.

*Primary Examiner* — Stephanie Sebasco Cheng
(74) *Attorney, Agent, or Firm* — Norton Rose Fulbright Canada LLP

(57) ABSTRACT

An ejector comprises a primary nozzle having an annular wall forming part of an outer boundary of an exhaust portion of a primary flow path of a gas turbine engine. The annular wall has a downstream end defining a plurality of circumferentially distributed lobes. The ejector further comprises a secondary nozzle having an annular wall disposed about the primary nozzle, the primary nozzle and the secondary nozzle defining a secondary flow passage therebetween for channeling a secondary flow. The secondary nozzle defines a mixing zone downstream of an exit of the primary nozzle. A flow guide ring is mounted to the primary nozzle lobes. The ring has an aerodynamic surface extending from a leading edge to a trailing edge respectively disposed upstream and downstream of the exit of the primary nozzle. The aerodynamic surface of the ring is oriented to guide the high velocity primary flow into the mixing zone.

8 Claims, 7 Drawing Sheets

Related U.S. Application Data continuation-in-part of application No. 14/446,756, filed on Jul. 30, 2014, now Pat. No. 9,745,919.

(51) Int. Cl.
*F02K 1/48* (2006.01)
*F02C 3/10* (2006.01)

(52) U.S. Cl.
CPC .. *F05D 2220/324* (2013.01); *F05D 2250/232* (2013.01); *F05D 2250/61* (2013.01); *F05D 2260/601* (2013.01)

(58) Field of Classification Search
CPC .. F02K 1/40; F05D 2250/61; F05D 2260/601; F01D 25/30; F02C 3/32
See application file for complete search history.

(56) References Cited

U.S. PATENT DOCUMENTS

| | | | |
|---|---|---|---|
| 3,726,091 A | 4/1973 | Tontini | |
| 4,335,801 A | 6/1982 | Stachowiak et al. | |
| 5,143,517 A * | 9/1992 | Vermont | F01D 5/22 |
| | | | 416/190 |
| 5,161,949 A * | 11/1992 | Brioude | F01D 5/22 |
| | | | 416/193 A |
| 5,253,419 A * | 10/1993 | Collot | B21D 26/055 |
| | | | 29/889.72 |
| 5,265,408 A * | 11/1993 | Sheoran | B64D 33/08 |
| | | | 60/262 |
| 5,265,807 A * | 11/1993 | Steckbeck | F02K 1/48 |
| | | | 181/213 |
| 5,440,875 A * | 8/1995 | Torkelson | F02K 1/386 |
| | | | 60/226.1 |
| 5,761,900 A | 6/1998 | Presz | |
| 5,884,472 A | 3/1999 | Presz | |
| 6,233,920 B1 | 5/2001 | Presz | |
| 6,412,283 B1 | 7/2002 | Sheoran et al. | |
| 7,882,696 B2 | 2/2011 | Anderson et al. | |
| 8,590,316 B2 | 11/2013 | Conete et al. | |
| 8,794,902 B1 * | 8/2014 | Van Ness, II | F02K 1/48 |
| | | | 415/1 |
| 9,745,919 B2 | 8/2017 | Di Paola | |
| 2005/0262826 A1 | 12/2005 | Anderson | |
| 2006/0059891 A1 | 3/2006 | Sheoran | |
| 2006/0207239 A1 | 9/2006 | Anderson | |
| 2010/0199626 A1 | 8/2010 | Harding et al. | |
| 2011/0036068 A1 | 2/2011 | Lefebvre et al. | |
| 2015/0101338 A1 * | 4/2015 | Pouyau | F01D 25/04 |
| | | | 60/770 |

\* cited by examiner

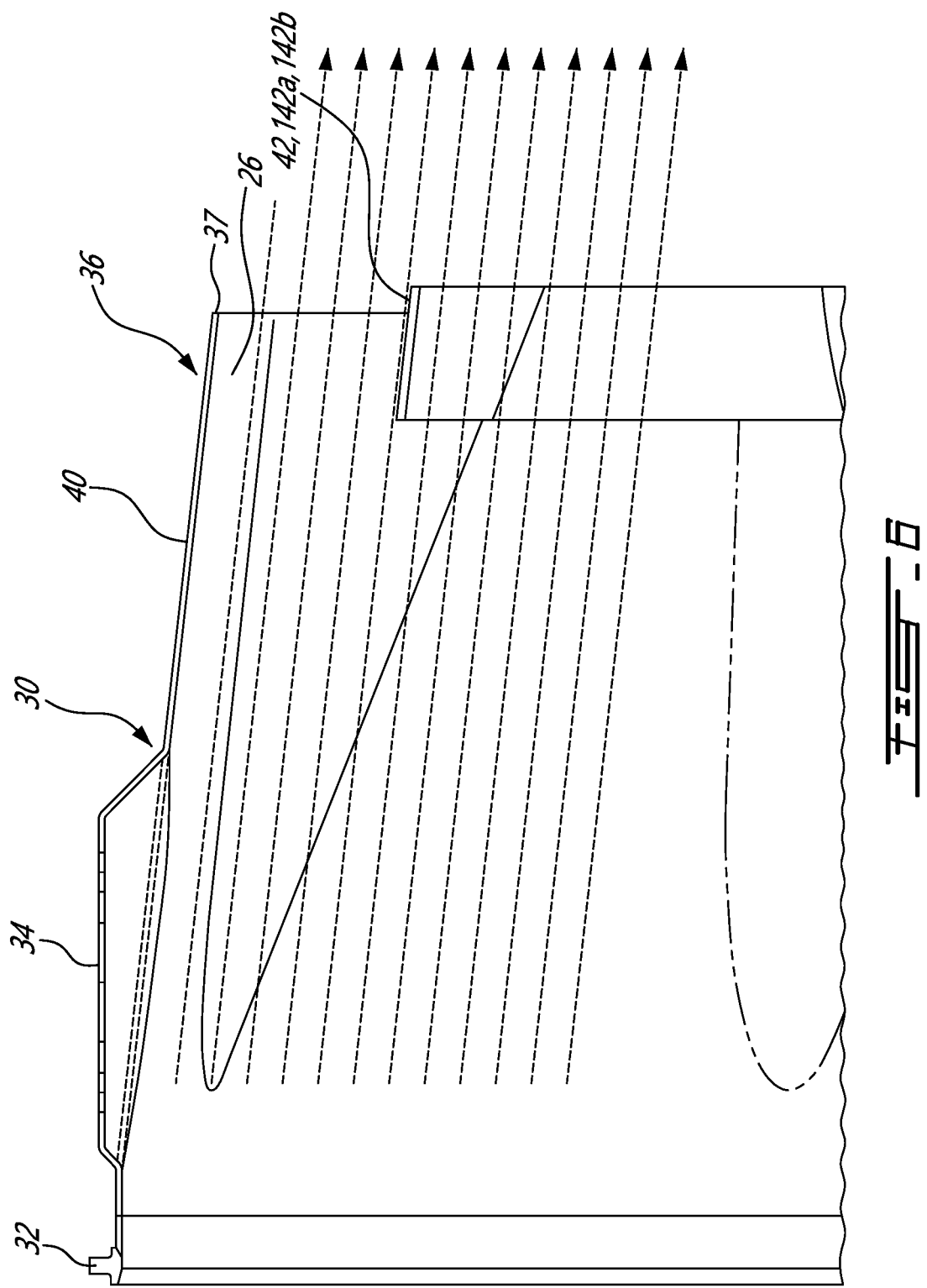

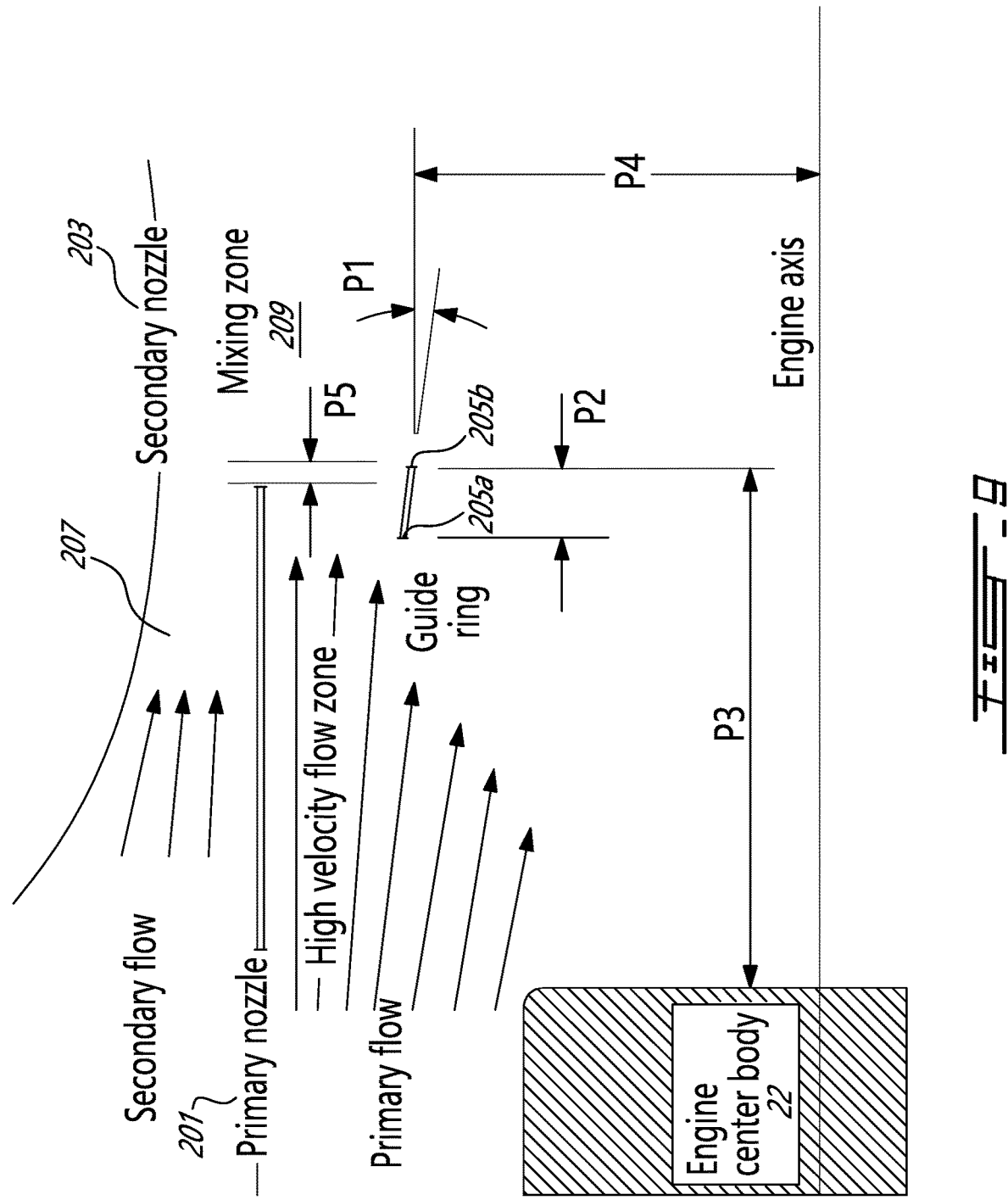

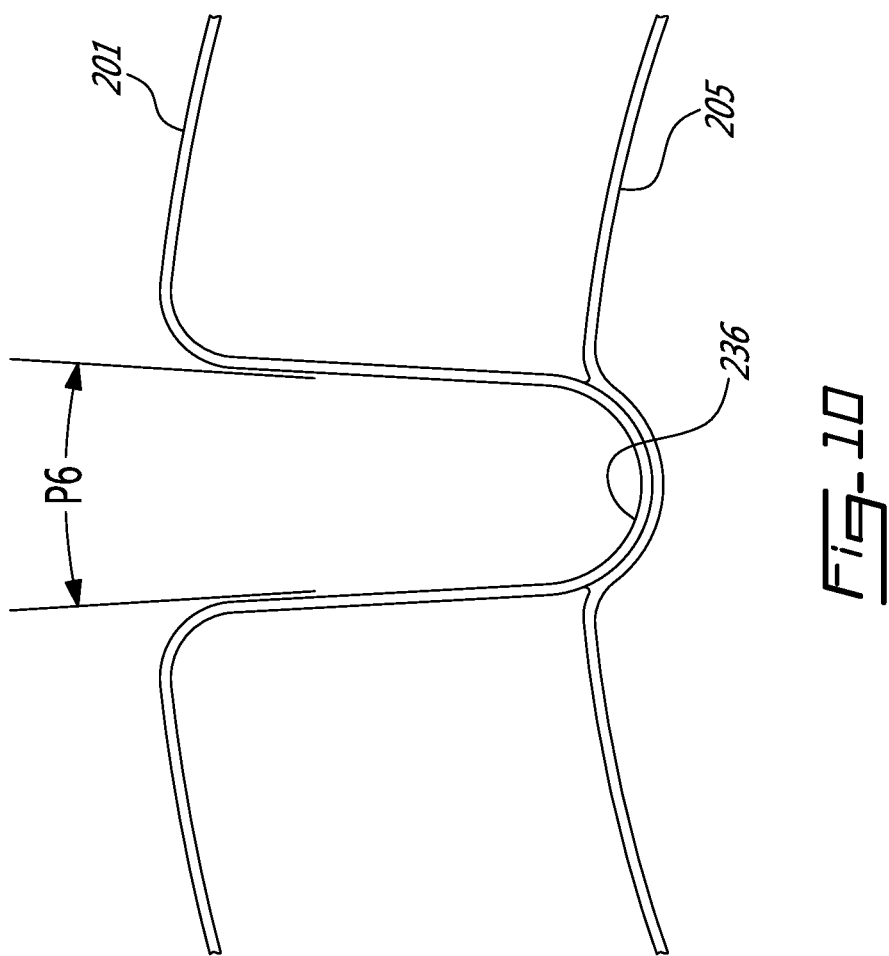

TURBO-SHAFT EJECTOR WITH FLOW GUIDE RING

RELATED APPLICATION

This application is a divisional of U.S. patent application Ser. No. 14/514,770, filed Oct. 15, 2014, which is a continuation-in-part of U.S. patent application Ser. No. 14/446,756 filed on Jul. 30, 2014, now patented under U.S. Pat. No. 9,745,919, issued Aug. 29, 2017 the content of which is incorporated herein by reference.

TECHNICAL FIELD

The application relates generally to aircraft gas turbine engines and, more particularly, to aft section of the engine including an ejector.

BACKGROUND OF THE ART

In gas turbine engines, hot high velocity air exits from the turbine through the core gas path. The exhaust gases may be constrained by an exhaust case section in the form of a corrugated annular case extension having lobes. Turbofan engines generally use exhaust mixers in order to increase the mixing of the high and low velocity exhaust gas flows. Turbo-shaft and turbo-prop engines may be provided with similar devices sometimes referred to as ejectors. Exhaust mixers/ejectors may experience thermal variation and/or radial deflection due to exposure to the high and low velocity flows. In addition, exhaust ejector/mixers may be prone to vibrations, which have negative consequences for the surrounding hardware. As such, it is generally desirable to increase the stiffness or rigidity of the exhaust case. Various configurations of exhaust ejector/mixers have been proposed to date in order to try to increase the stiffness or reduce deflection thereof.

Also, the aerodynamic performance of ejectors is often limited by the ability of the primary flow to entrain the secondary cooling flow. Increasing the ejector capacity of pumping secondary mass flow would also be desirable from an aerodynamic point of view.

SUMMARY

In one aspect, there is provided an ejector for a gas turbine engine of the type having a main axis and a primary flow passage channeling a high velocity primary flow, the ejector comprising: a primary nozzle having an annular wall forming part of an outer boundary of an exhaust portion of the primary flow passage, the annular wall having a downstream end defining a plurality of circumferentially distributed radially inner lobes; a secondary nozzle having an annular wall disposed about the primary nozzle, the primary nozzle and the secondary nozzle defining a secondary flow passage therebetween for channeling a secondary flow, the secondary nozzle defining a mixing zone downstream of an exit of the primary nozzle where the high velocity primary flow and the secondary flow mix together; and a flow guide ring mounted to the circumferentially distributed lobes in the exhaust portion of the primary flow passage centrally about the main axis of the engine, the flow guide ring having an aerodynamic surface extending from a leading edge to a trailing edge respectively disposed upstream and downstream of the exit of the primary nozzle, the aerodynamic surface being oriented to guide the high velocity primary flow into the mixing zone.

In accordance with another general aspect, there is provided a gas turbine engine having an engine casing enclosing a compressor section, a combustor and a turbine section defining a main gas path serially extending therethrough along a main axis of the engine, and comprising: an ejector projecting from an aft end of the engine casing axially downstream from an engine center body forming an aft end portion of an inner boundary of the main gas path, the ejector comprising a primary nozzle having an annular wall forming an outer boundary of the main gas path for guiding a primary flow, the annular wall having a downstream end defining a plurality of circumferentially distributed lobes, and a flow guide ring mounted to the circumferentially distributed lobes in the main gas path centrally about the main axis and downstream of the engine center body; the flow guide ring having an aerodynamic surface configured to minimize diffusion of the primary flow towards the main axis of the engine.

BRIEF DESCRIPTION OF THE DRAWINGS

Reference is now made to the accompanying figures in which:

FIG. 6 is a schematic, axial cross section of a portion of the ejector/mixer showing the main gas path, and the support member located and oriented in the gas path;

FIG. 9 is a schematic, axial cross section of a portion of the ejector shown in FIG. 8; and FIG. 10 is an enlarged radial cross section of a portion of the ejector shown in FIG. 8 and illustrating the ejector lobe draft angle.

DETAILED DESCRIPTION

Figure 1:
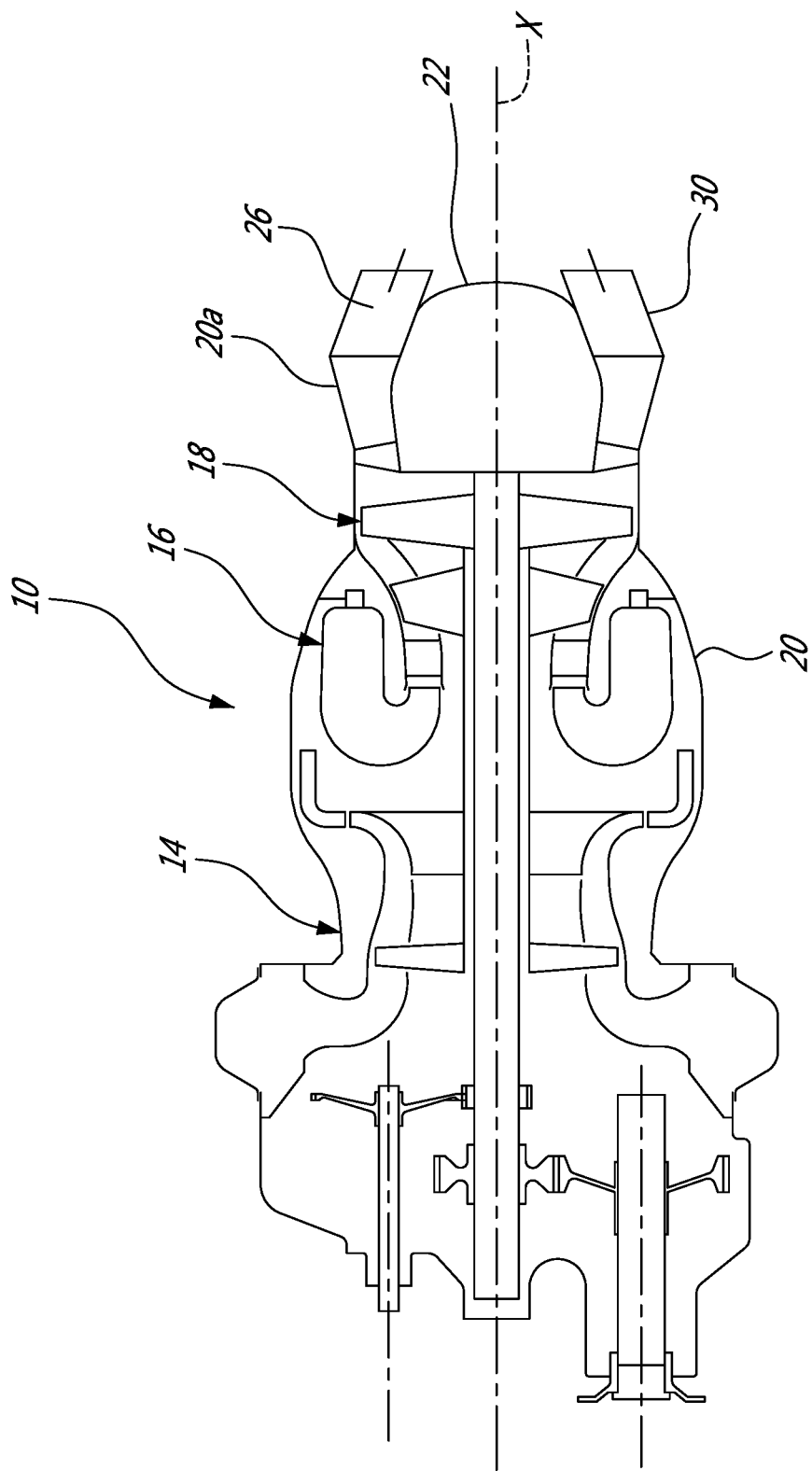
FIG. 1 is a schematic cross-sectional view of a turbo-shaft gas turbine engine.

FIG. 1 illustrates a turbo-shaft gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 includes a core engine casing 20 which encloses the turbo machinery of the engine. The main air flow passes through the core of the engine via a main gas path 26, which is circumscribed by the core engine casing 20 and allows the flow to circulate through the multistage compressor 14, combustor 16 and turbine section 18 as described above.

Figure 2:
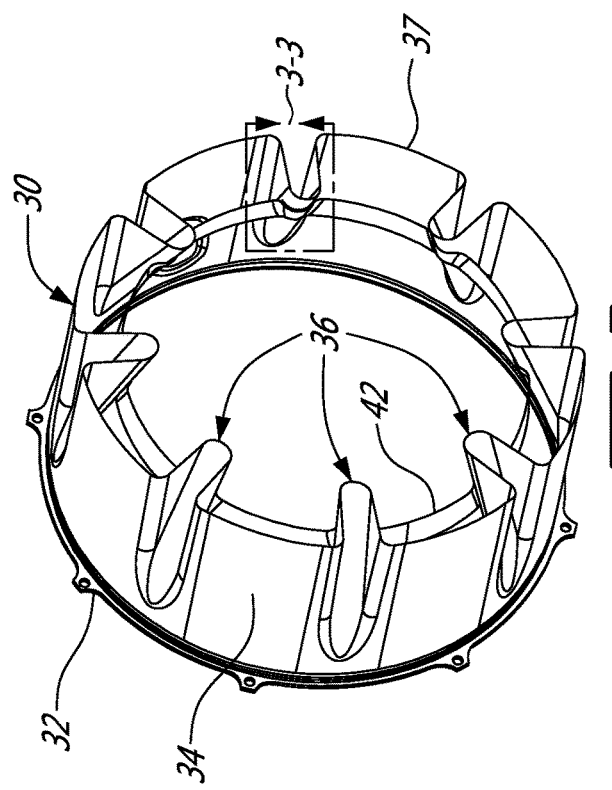
FIG. 2 is a rear isometric view of an exhaust ejector/mixer, having a support member connected to the ejector/mixer lobes thereof, in accordance with one embodiment of the present disclosure.

At the aft end of the engine 10, an engine center body 22 is centered about a longitudinal axis X of the engine 10, the engine center body 22 being connected to an aft end of the turbine section 18. The engine center body can take the form of an exhaust cone depending on the application. The engine center body 22 has an outer surface, which defines an inner wall of the main gas path 26 so that the combustion gases flow therearound. An ejector/mixer 30 forms the outer wall of the aft end of the main gas path 26. As best seen in FIG. 2, the ejector/mixer 30 includes a primary nozzle having an annular wall 34 with a radial fastening ring or flange 32 upstream thereof. The fastening ring 32 is adapted to be mechanically fastened to the aft portion 20a (FIG. 1) of the casing 20.

Figure 3:
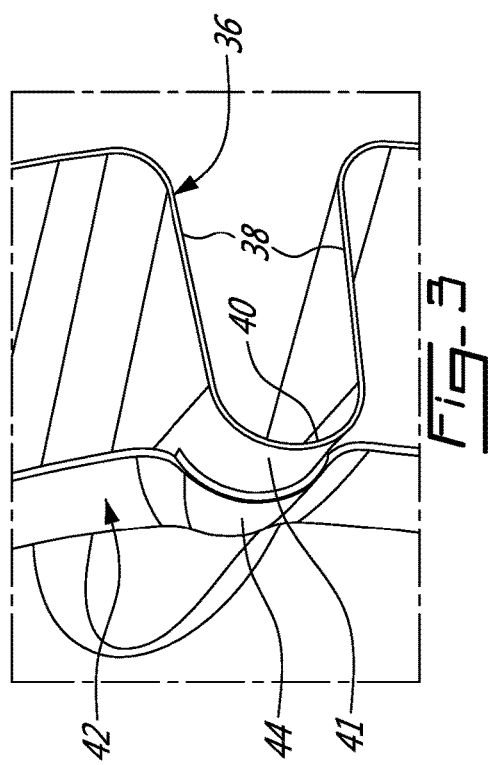
FIG. 3 is an enlarged fragmentary, isometric view of a lobe and support member according to FIG. 2.

Referring to FIGS. 2 and 3, in further detail, the annular wall 34 of the primary nozzle, includes and defines a plurality of circumferentially distributed radially inner lobes 36 extending axially rearwardly from a front frusto-conical portion of the annular wall 34 to a downstream edge 37, i.e. a trailing edge thereof. The lobes 36 include side, radially-extending, walls 38 with a bight forming an arcuate trough 40. The trough 40 presents a convex surface 41 on the radially inner or central side of the annular wall 34.

An annular support member includes an annular blade 42 extending concentrically about the longitudinal axis X of the engine 10. In the embodiment shown, the blade 42 comprises an annular longitudinal, flat bar. The blade 42 is interrupted only at form-fitting joint areas 44. The joint areas 44 are located on the blade 42 to correspond with the convex surfaces 41 of the lobes 36. The joint areas 44 are curved so that it complements the convex surface 41, as shown in FIG. 3. The curved joint area 44 is concave relative to the convex surface 41 of the lobe 36. The blade 42 is spaced radially outwardly and independent from the engine center body 22 and floats with respect thereto. The blade 42 in one embodiment is a thin sheet metal strip capable of being welded to the sheet metal forming the annular wall 34. In the embodiment shown in FIGS. 2 and 3, the thin sheet metal strip is formed into a continuous ring.

As mentioned, the ejector/mixer 30 is solely connected to the engine 10 at the aft end 20a of the core engine casing 20, and so, the ejector/mixer 30 is effectively cantilevered from the core engine casing 20. This cantilevered configuration allows the lobes 36 of the exhaust ejector/mixer 30 to vibrate at one or more modes in the engine operating frequency range, while remaining relatively stiff. In addition, the thermal variations in the exhaust mixer 30 due to the high and low velocity flows through the main gas path 26 may cause axial and radial displacements in the ejector/mixer 30, which can accordingly be absorbed by the exhaust ejector/mixer 30. Moreover, the downstream end 37 of the ejector/mixer 30, which would otherwise be prone to deflection, is reinforced by the blade 42 which serves to increase the rigidity of the exhaust ejector/mixer 30 and thus inhibit movement at the downstream end 37 thereof. By joining all the lobes 36 together with the blade 42, any movement of the ejector/mixer 30 is reduced, as are the vibrations thereof. In addition, by providing a blade 42 which is independent of the exhaust engine center body 22, i.e. it is free to move relative thereto such as to absorb any vibrations or thermal growth mismatches therebetween. The blade 42 is able to accommodate any axial or radial displacements due to such thermal variations. As such, the ejector/mixer 30 provides enhanced rigidity and may accommodate thermal variations, vibrations and other displacements, as required.

Figure 4:
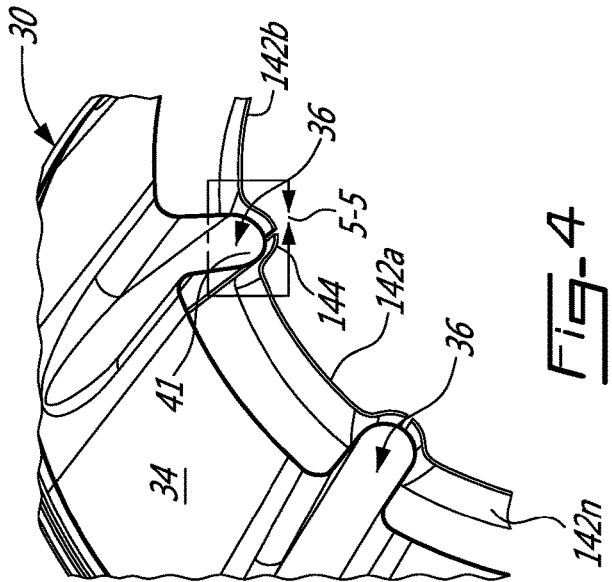
FIG. 4 is a fragmentary rear isometric view an ejector/mixer, having a support member connected to the lobes thereof, in accordance with another embodiment.
Figure 5:
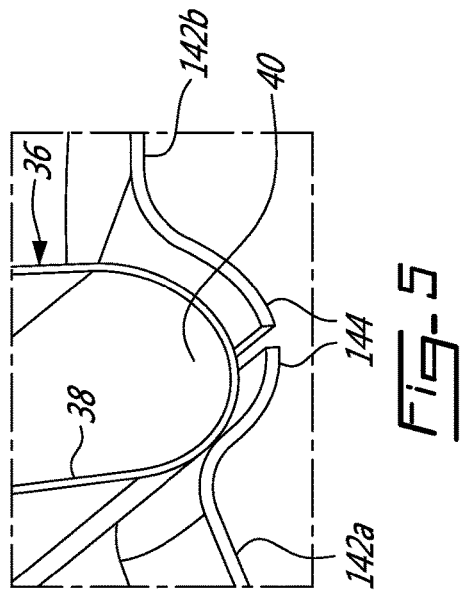
FIG. 5 is an enlarged fragmentary, isometric view of a lobe and support member according to FIG. 4.

Another embodiment is shown in FIGS. 4 and 5. In this case, the blade is made up of blade segments 142a, 142b . . . 142n. Each segment has a length corresponding to the distance between the center lines of two adjacent lobes 36. Each end of the segment terminates in a partially formed concave curve to complement part of the convex surface 41 of the lobe 36. For instance, as shown in FIG. 5, corresponding ends of segments 142a and 142b make-up the form fitting joint area 144.

The blade 42, 142 may be located at different axial positions along the convex surfaces 41 of the lobe 36. FIG. 3 illustrates a blade 42 being spaced upstream from the trailing edge 37, of the lobe 36. As shown in FIG. 5, the blade 142 is located at or slightly downstream from the trailing edge 37, of the lobe 36. The blade 42, 142 may be fixed to the convex surfaces 41 of the lobes 36 at joint areas 44, 144 using a combination of resistance, fusion or ball tack welding with a brazing application, or other types of suitable bonding that are well known in the art.

Figure 7:
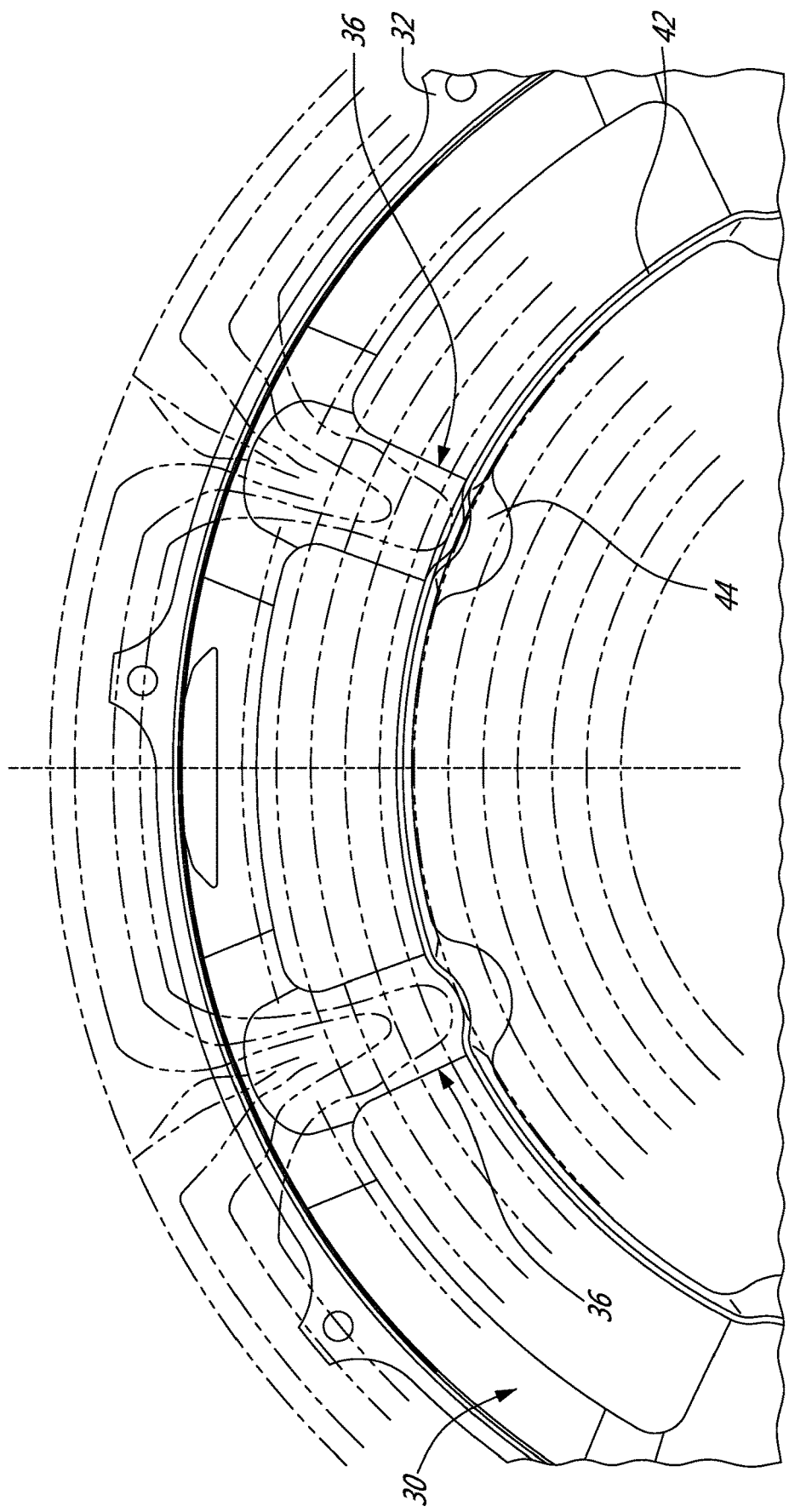
FIG. 7 is a schematic, radial cross section of a portion of the ejector/mixer showing the hot main gas path and the induced cool air in the lobes; and illustrating the relative location of the support member.

The injector/mixer 30, in the present embodiment, acts to induce cool air, exterior of the engine casing 20, to be drawn radially inwardly through the lobes 36 to cool the mechanical parts of the injector/mixer 30. As previously mentioned, the support member is often, according to the prior art, subject to thermal stresses caused by the entrained cool air and of the hot air exiting the turbine 18. FIGS. 6 and 7 show the gases flow in the ejector/mixer 30. The blade 42, 142 is disposed directly in the main gas path 26 and is shaped to be laminar with the flow of the hot gases, as can be seen in both FIGS. 6 and 7. The blade 42 is essentially exposed only to the hot gases flowing in the main gas path 26. This reduces the thermal gradient in the blade 42, 142.

The embodiments described show a turbo-shaft engine. However, in the case of a turbofan engine, cool air from the fan is directed to the ejector/mixer 30 which in such a case would have inner and outer alternating lobes to best mix the hot gases with the cool air. U.S. Pat. No. 5,265,807 Steckbeck et al 1993; U.S. Pat. No. 7,677,026 Conete et al 2010; and U.S. Pat. No. 8,739,513 Lefebvre et al 2014 describe exhaust mixers which are herewith incorporated by reference.

The above described embodiments provide an improved exhaust ejector/mixer for a gas turbine engine where the thermal stresses on the support member are reduced for improved longevity.

It is noted that the ejector/mixer and the support member could be made by additive manufacturing processes, such as direct metal laser sintering. Therefore, the ejector/mixer and the support member could be made monolithically.

For some gas turbine engine applications, such as turbo shaft and turbo prop applications, where the engine center body 22 ends axially upstream of the turbine exhaust nozzle exit (see FIG. 9), the exhaust section is referred to as an ejector. As will be seen hereinafter, for such applications, the support member may also act as a flow guide ring to guide the primary flow when leaving the primary nozzle and, thus, enhance the ejector aerodynamic performance.

Figure 8:
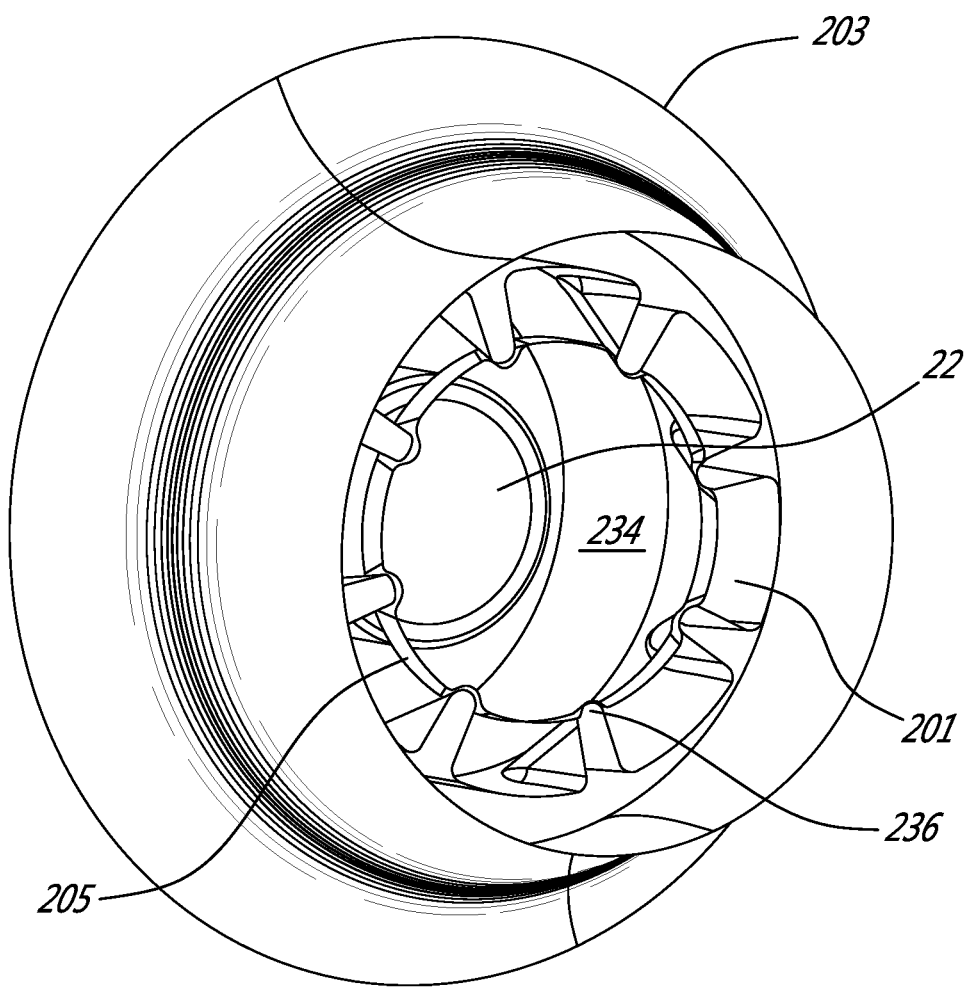
FIG. 8 is a rear isometric view of an ejector suited for mounting at the exhaust end of a turbo-prop or a turbo-shaft.

FIG. 8 illustrates an ejector 200 comprising a primary nozzle 201, a secondary nozzle 203 concentrically mounted about the primary nozzle 201 and a flow guide ring 205 concentrically mounted inside the primary nozzle 201.

As mentioned hereinbefore with respect to the embodiments shown in FIGS. 1 to 7, the primary nozzle 201 has an annular wall 234 forming part of the outer boundary of an exhaust portion of the main or primary flow passage of the engine. The annular wall 234 has a downstream end formed with circumferentially distributed radially inner lobes 236. The flow guide ring 205 is attached to the radially inner surface of the lobe valleys as described herein above.

The secondary nozzle 203 has an annular bell-shaped wall extending from the engine compartment wall case (not shown) about the primary nozzle 201. As best shown in FIG. 9, the primary nozzle 201 and the secondary nozzle 203 define a secondary flow path 207 therebetween for guiding a secondary flow of cooling air. The secondary nozzle 203 extends axially downstream of the primary nozzle 201 and defines a mixing zone 209 at the exit of the primary nozzle 201 where the high velocity primary flow mixes with the secondary flow.

Referring conjointly to FIGS. 8 and 9, it can be appreciated that primary nozzle 201 of the ejector 200 extends axially downstream of the engine center body 22 (i.e. the inner boundary of the primary flow passage ends upstream of its outer boundary). As a result, the primary flow tends to diffuse towards the engine centerline downstream of the end of the center body 22.

The addition of a properly designed flow guide ring 205 can prevent the annular high momentum primary flow from diffusing and guide the flow through the annular zone between the flow guide ring 205 and the primary nozzle 201 where the primary and secondary flows mix. Due to this fact, the capacity of pumping secondary mass flow may be improved.

According to the embodiment illustrated in FIGS. 8 and 9, the flow guide ring 205 has a cone shape with a proper cone angle (P1) with respect to engine axis (see FIG. 9). This is to ensure that the primary flow is well guided without separation when leaving the primary nozzle and entering the mixing zone. The ring cone angle (P1) may be in the range of about 0° to about 10° and is preferably about 5°. Depending on the application, the flow guide ring 205 could be cylindrical or airfoil as well.

As shown in FIG. 9, the flow guide ring 205 has an aerodynamic surface extending axially from a leading edge 205a to a trailing edge 205b. According to the illustrated embodiment, the leading edge 205a and the trailing edge 205b are respectively disposed upstream and downstream of the primary nozzle exit to properly guide the primary flow leaving the primary nozzle 201 into the mixing zone 209. According to the illustrated embodiment, the flow guide ring 205 projects out of the primary nozzle 201 or extends downstream from the exit of the primary nozzle 201 by a distance (P5) for extended flow guidance in the mixing zone and avoidance of flow separation across the ring 205. For a particular application, the distance (P5) is in the range of about 0 to about 1 inch.

The length (P2) of the guide ring 205 and its axial installation position (P3) relative to the end of the center body 22 may also influence the aerodynamic performance of the ejector 200. It is understood that (P2) and (P3) can be optimized depending on different applications. According to a particular application, the ring length (P2) is in the range of about 0.5 to about 2 inches and the ring 205 is installed axially at the primary nozzle exit.

The radial installation position of the guide ring (P4) may vary depending on various conditions. According to the illustrated embodiment, the ring 205 is installed at the lobe valley. It is also understood that the lobe design and the number of lobes 236 may vary depending on the applications. According to the illustrated embodiment, the lobes 236 have a draft angle (P6) of about 0° to about 5° (FIG. 10). Such a small draft angle can help prevent reverse back secondary flow. The number of lobes may vary depending on the size of the engine. For the exemplified application given above, the number of lobes may range between 8 and 10.

Various permutations of the above parameters of the flow guide ring can be used to improve the ejector pumping capacity.

The above description is meant to be exemplary only, and one skilled in the art will recognize that changes may be made to the embodiments described without departing from the scope of the invention disclosed. For example, the invention may be used with various types of gas turbine engines where cool and hot gases may simultaneously be in contact with the machinery involved. Still other modifications which fall within the scope of the present invention will be apparent to those skilled in the art, in light of a review of this disclosure, and such modifications are intended to fall within the appended claims.

The invention claimed is:

1. A turbo-shaft gas turbine engine having an engine casing enclosing a compressor section, a combustor and a turbine section defining a main gas path serially extending therethrough along a main axis of the turbo-shaft gas turbine engine, and comprising:
    an ejector cantilevered from an aft end of the engine casing and projecting axially downstream from an engine center body having a truncated downstream end forming an aft end portion of an inner boundary of the main gas path,
    the ejector comprising a primary nozzle having an annular wall forming an outer boundary of the main gas path for guiding a primary flow,
    the annular wall having a downstream end defining a plurality of circumferentially distributed lobes,
    the plurality of circumferentially distributed lobes projecting radially inwardly towards the main axis of the turbo-shaft gas turbine engine, and
    a flow guide ring mounted in the main gas path, to a radially inner end of each of the plurality of circumferentially distributed lobes, concentrically about the main axis, and downstream of the engine center body,
    the flow guide ring having a leading edge and a trailing edge, the leading edge axially spaced downstream from the truncated downstream end of the engine center body;
    the radially outer surface of the flow guide ring being a conical aerodynamic surface converging radially inwardly from the leading edge of the flow guide ring to the trailing edge of the flow guide ring towards the main axis of the turbo-shaft gas turbine engine,
    the trailing edge located radially closer to the main axis than the leading edge,
    the conical aerodynamic surface configured to minimize diffusion of the primary flow towards the main axis of the turbo-shaft gas turbine engine,
    a plurality of circumferentially spaced-apart concave surface portions formed on the conical aerodynamic surface, each of the plurality of circumferentially spaced-apart concave surface portions matingly engaged with a respective convex surface of a respective one of the plurality of circumferentially distributed lobes, on a radially inner side and at the radially inner end of the respective one of the plurality of circumferentially distributed lobes.

2. The turbo-shaft gas turbine engine according to claim 1, wherein the ejector further comprises a secondary nozzle concentrically mounted about the primary nozzle, the primary nozzle and the secondary nozzle defining a secondary flow passage therebetween for channeling a secondary flow, the secondary nozzle circumscribing a mixing zone downstream of an exit of the primary nozzle, and wherein the flow guide ring is configured and disposed to guide the primary flow as it exits from the primary nozzle into the mixing zone.

3. The turbo-shaft gas turbine engine according to claim 1, wherein the flow guide ring is a circumferentially continuous one-piece metallic strip.

4. The turbo-shaft gas turbine engine according to claim 2, wherein the trailing edge of the flow guide ring extends axially downstream of the exit of the primary nozzle by a distance P5, and wherein P5 is equal to or less than 1 inch.

5. The turbo-shaft gas turbine engine according to claim 1, wherein the conical aerodynamic surface of the flow guide ring extends at an angle to the main axis, the angle being equal to or less than 10 degrees.

6. The turbo-shaft gas turbine engine according to claim 5, wherein the angle is 5 degrees.

7. The turbo-shaft gas turbine engine according to claim 1, wherein the each of the plurality of circumferentially distributed lobes has a draft angle between 0° and 5°.

8. The turbo-shaft gas turbine engine according to claim 1, wherein the flow guide ring has an axial length P2 between 0.5 inches and 2 inches.

* * * * *